United States Patent Office 2,789,104
Patented Apr. 16, 1957

2,789,104

RUBBER STABILIZED WITH HYDROCARBON TIN MERCAPTIDES

Hugh E. Ramsden, Metuchen, N. J., Elliott L. Weinberg, New York, N. Y., and Louis A. Tomka, Westfield, N. J., assignors to Metal & Thermit Corporation, New York, N. Y., a corporation of New Jersey No Drawing. Application January 29, 1954,
Serial No. 407,153

20 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface crackings, etc., are adversely affected by aging in the absence of stabilizers normally termed rubber anti-oxidants.

It has been found that hydrocarbontin mercaptides—or to state it in another fashion, organotin derivatives of mercaptans having the formula $$R_nSn(SR')_{4-n}$$

where R is an alkyl, aryl, aralkyl radical and R' is an alkyl, aryl, aralkyl radical and where $n$ is an integer in the order of 1, 2 or 3, are effective antioxidants for natural and synthetic rubbers. In these compounds, the hydrocarbontin radical containing the C-Sn group is bonded directly to the sulfur radical by Sn-S bonds.

Compounds coming under the above formula may be prepared in any suitable manner. For example, they may be prepared in high yield and purity by the reaction of an hydrocarbontin oxide, hydroxide or a stannoic acid with a mercaptan. Another process for preparing these derivatives is to react a hydrocarbontin halide with a mercaptan in the presence of basic acid acceptors, such as alkali and alkaline-earth metal oxides, hydroxides, bicarbonates or carbonates. Tertiary amines may also be used as acid acceptors in the process.

Among the hydrocarbontin derivatives that may be employed are those having methyl, ethyl, butyl, propyl, lauryl, tolyl, phenyl, phenylethyl, diphenyl or benzyl groups attached directly to tin atoms.

Among the mercaptans that may be employed are the following: methyl, ethyl, butyl, lauryl, phenyl, phenylethyl, tolyl, benzyl, nonyl, n-heptyl, ter-hexyl, n-octyl and n-amyl mercaptans. The hydrocarbontin mercaptides are extremely effective as rubber-anti-oxidants as demonstrated by their stabilizing ability at exceptionally low concentrations, and are effective at .05% to 5% based on the weight of the rubber with a preferred range of .1 to 1% hydrocarbontin mercaptide based on the weight of the rubber.

These hydrocarbontin mercaptides, when used as rubber anti-oxidants, are non discoloring, and thereby permit the manufacture of stable white stocks.

The hydrocarbontin mercaptides herein described can effectively be used as anti-oxidants with elastomers and more specifically with rubbery materials of the class consisting of (a) natural rubber, (b) rubber-like copolymers of 1,3 butadiene and styrene (GR-S type), (c) rubber-like copolymers of 1,3 butadiene and acrylonitrile (nitrile type) and (d) rubber-like homopolymers of chloroprene (neoprene type).

The hydrocarbontin mercaptides may be milled into the rubbery materials defined above, without other additions, for the purpose of preventing degradation during storage. More commonly, they will be incorporated with other materials during compounding.

Any suitable compounding formulation may be employed. A specific example of a natural rubber composition, in which the hydrocarbontin mercaptides are effective as an anti-oxidant, is as follows:

| | Parts by weight |
|---|---|
| Thin, pale crepe | 100.0 |
| Zinc oxide (lead free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any one of the hydrocarbontin mercaptides coming under the general formula set forth above, in proportions of 0.05% to 5% by weight, based on the weight of the rubber ingredient of said composition and preferably in the approximate 0.1% level. This compounded rubber composition containing the anti-oxidant was worked and blended by conventional techniques and vulcanized at 275° F. for twenty minutes in an hydraulic press.

The effectiveness of the hydrocarbontin mercaptides herein described as anti-oxidants, is indicated by the following test results carried out with the specific rubber composition described above containing anti-oxidant in the amounts and manner shown below.

Example 1. No anti-oxidant
Example 2. .01 pt. of dibutyltin S,S' bis (lauryl mercaptide)
Example 3. 1 pt. of dibutyl tin S,S' bis (lauryl mercaptide)
Example 4. 1 pt. commercial anti-oxidant The test methods employed to determine the anti-oxidant properties consisted of (1) outdoor exposure and (2) the oxygen bomb test—ASTM Procedure D–572–48. The outdoor exposure test samples were examined for tackiness, surface checking and discoloration. The oxygen bomb test samples were examined for changes in tensile strength, elongation and modulus by means of standard equipment.

The results of the tests on the examples described above were as follows:

*Outdor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | Discolored | Slight | Pronounced. |

*Oxygen bomb test—4 days at 70° C.*

| Sample | Modulus (p. s. i.) 200% Elongation | | (p. s. i.) Tensile Strength | | Percent Elongation | |
|---|---|---|---|---|---|---|
| | Orig. | Aged | Orig. | Aged | Orig. | Aged |
| Ex. 1 | 270 | 270 | 2,980 | 1,300 | 600 | 500 |
| Ex. 2 | 280 | 305 | 3,100 | 2,400 | 605 | 550 |
| Ex. 3 | 260 | 300 | 2,970 | 2,250 | 640 | 515 |
| Ex. 4 | 250 | 315 | 3,210 | 2,400 | 645 | 525 |

Similar tests on GR-S rubber (1,3 butadiene-styrene) indicate that the stabilization of synthetic rubber with organo tin derivatives of the general type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made, and equivalents substituted therefor, without departing from the principles and true nature of the invention.

We claim:

1. A rubber composition comprising, as a basic ingredient, a rubbery polymer selected from the group consisting of natural rubber, copolymers of 1,3 butadiene and styrene, and copolymers of 1,3 butadiene and acrylonitrile and containing a stabilizing amount of a hydrocarbontin derivative of a mercaptan having the formula:

$$R_nSn(SR')_{4-n}$$

wherein R and R' are hydrocarbon radicals selected from the group consisting of alkyl, aryl and aralkyl radicals and $n$ is an integer from 1 to 3.

2. A composition according to claim 1, wherein the stabilizer is present in the amount of about 0.05% to 5% by weight, based on the rubber ingredients.

3. A composition according to claim 1, wherein the stabilizer is present in the amount of about .1% to 1% by weight based on the rubber ingredients.

4. A composition according to claim 3, wherein the composition is cured.

5. A composition according to claim 3, wherein the composition contains pigment.

6. A rubber composition comprising as a basic ingredient a copolymer of 1,3 butadiene and styrene and containing a stabilizing amount of a hydrocarbontin derivative of a mercaptan having the formula:

$$R_nSn(SR')_{4-n}$$

wherein R and R' are hydrocarbon alkyl radicals and $n$ is an integer from 1 to 3.

7. A composition according to claim 6, wherein $n$ is 2.

8. A composition according to claim 7, wherein the stabilizer is present in the amount of 0.05% to 5% by weight, based on the rubber ingredients.

9. A composition according to claim 8, wherein the composition is cured.

10. A composition according to claim 7, wherein the stabilizer is present in the amount of about .1% to 1% by weight, based on the rubber ingredients.

11. A composition according to claim 7, wherein the organotin stabilizer is dibutyltin S,S' bis(lauryl mercaptide).

12. A composition according to claim 11, wherein the stabilizer is present in an amount of about 0.05% to 5% by weight, based on the rubber ingredients.

13. A composition according to claim 12, wherein the composition is cured.

14. A composition according to claim 11, wherein the stabilizer is present in an amount of about .1% to 1% by weight, based on the rubber ingredients.

15. A composition according to claim 14, wherein the composition is cured.

16. The method which comprises curing the composition of claim 1.

17. The method of claim 16, wherein said organotin compound is present in the amount of about 0.5% to 5% by weight, based on the rubber ingredients.

18. The method of claim 16, wherein said organotin compound is present in the amount of about 0.1% to 1% by weight, based on the rubber ingredients.

19. A method of treating a rubber composition containing, as a basic ingredient, a rubbery copolymer of 1,3 butadiene and styrene which comprises curing said composition in the presence of a stabilizing amount of dibutyltin S,S' bis(lauryl mercaptide).

20. A method according to claim 19, wherein the stabilizer is present in an amount of about .1% to 1% by weight, based on the rubber ingredients.

References Cited in the file of this patent

UNITED STATES PATENTS

| | | |
|---|---|---|
| 2,476,661 | Hart | July 19, 1949 |
| 2,641,588 | Leistner et al. | June 9, 1953 |
| 2,641,596 | Leistner et al. | June 9, 1953 |